Oct. 11, 1955 — F. T. HARRINGTON ET AL — 2,720,171
POWER TRANSMISSION
Filed Sept. 24, 1952 — 2 Sheets-Sheet 1
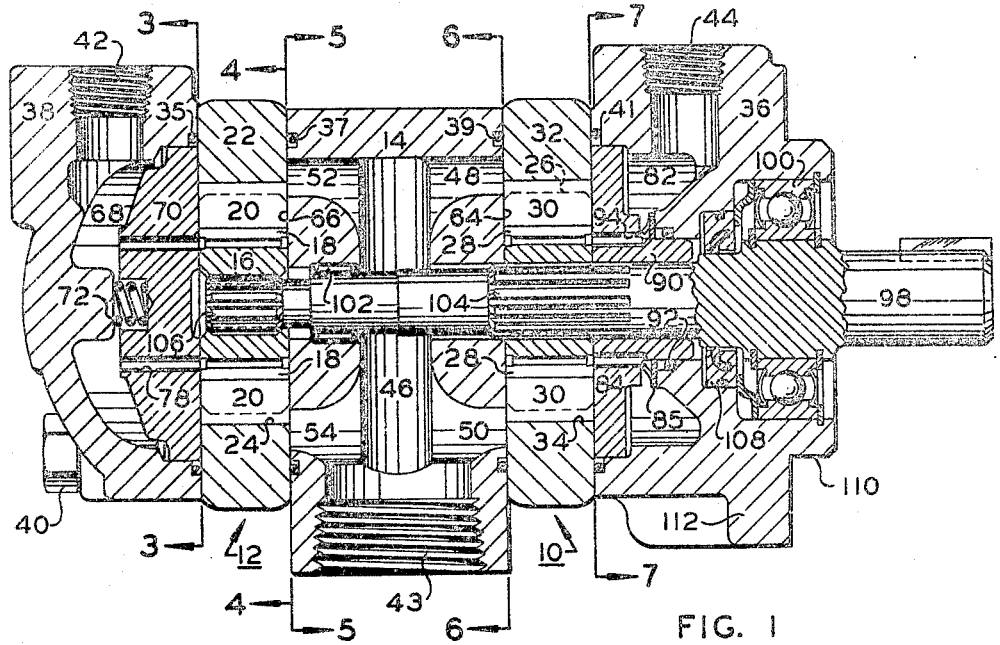
FIG. 1
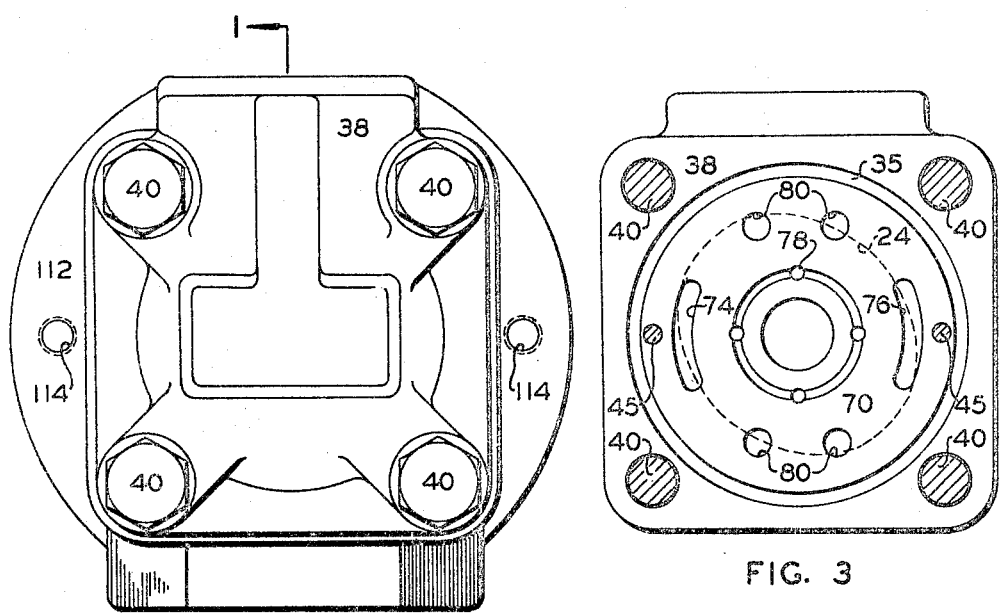
FIG. 2
FIG. 3
*INVENTORS*
FERRIS T. HARRINGTON
WILLIAM K. ALLEN
DUNCAN B. GARDINER
BY
*Ralph L. Truedale*
ATTORNEY Oct. 11, 1955  F. T. HARRINGTON ET AL  2,720,171
POWER TRANSMISSION
Filed Sept. 24, 1952  2 Sheets-Sheet 2

*INVENTORS*
FERRIS T. HARRINGTON
WILLIAM K. ALLEN
DUNCAN B. GARDINER
BY
ATTORNEY

United States Patent Office 2,720,171
Patented Oct. 11, 1955

2,720,171

POWER TRANSMISSION

Ferris T. Harrington, Detroit, William K. Allen, Grosse Pointe, and Duncan B. Gardiner, Detroit, Mich., assignors to Vickers Incorporated, Detroit, Mich., a corporation of Michigan Application September 24, 1952, Serial No. 311,284

7 Claims. (Cl. 103—4)

This invention relates to power transmissions, and is particularly applicable to those of the type comprising two or more fluid pressure energy translating devices, one of which may function as a pump and another as a fluid motor.

The invention is particularly concerned with a multiple pumping unit for use in power transmissions of this character. Hydraulic power transmission systems such as those used for operating machine tool slides frequently utilize a plurality of pumps, both for actuating a single hydraulic motor in some cases and in other cases for actuating a plurality of hydraulic motors. For example, it is common in actuating a single hydraulic motor, such as a cylinder and piston connected to a machine tool table or slide, to provide a large volume low pressure pump and a small volume high pressure pump. The delivery from both pumps may be utilized to provide a rapid traverse movement of the motor while only the small volume pump is utilized for providing a feeding movement of the motor. In another example separate hydraulic motors are separately connected to individual pumps which may be driven from a common prime mover. In addition there are many different hydraulic circuit hookups which utilize a plurality of pumps in various other ways.

It is apparent that where pumping units of various sizes are to be combined in a multiple pump unit, the number of possible combinations becomes quite large; for example, if ten sizes of pumping units are available the number of possible unique combinations is fifty-five. In the past such multiple pumping units have been assembled in a housing especially machined to accommodate a particular combination. These housings are generally a complicated casting requiring quite expensive machining. To carry an inventory of such castings is both costly and inconvenient.

It is an object of the present invention to provide a multiple pumping unit which obviates the difficulties aforementioned by providing a simple, inexpensive intermediate body portion, requiring a minimum of machining operations, which may be combined with certain selected parts of standard single pumping units to form an efficient and economical multiple pumping unit.

Further objects and advantages of the present invention will be apparent from the following description, reference being had to the accompanying drawings wherein a preferred form of the present invention is clearly shown.

In the drawings:

Figure 1 is a sectional view of a multiple pumping unit embodying a preferred form of the present invention and taken along the line 1—1 of Figure 2.

Figure 2 is an end elevation of the unit shown in Figure 1.

Figure 4:
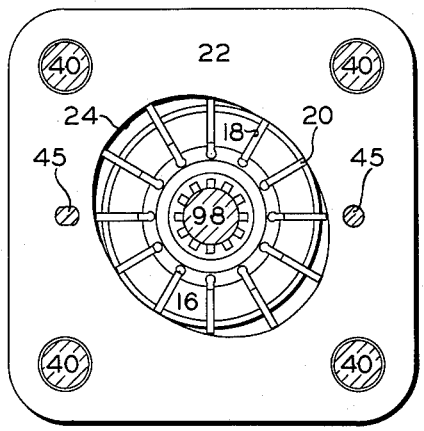
Figure 5:
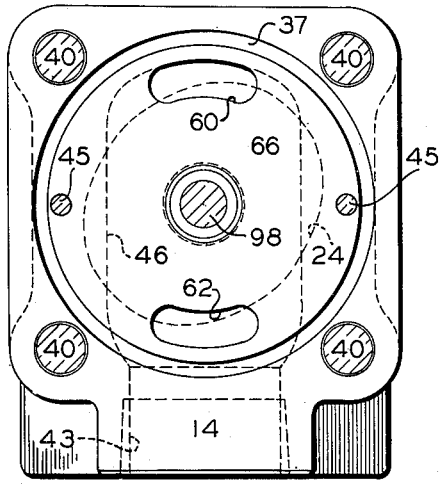
Figure 6:
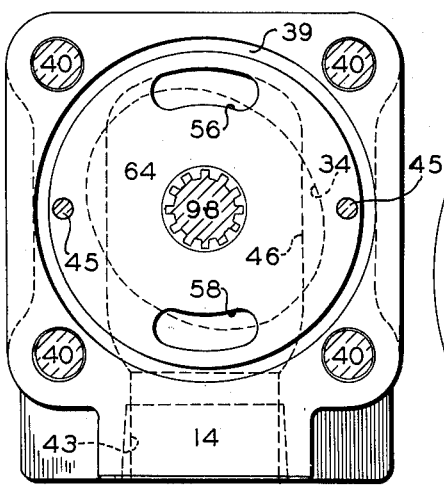
Figure 7:
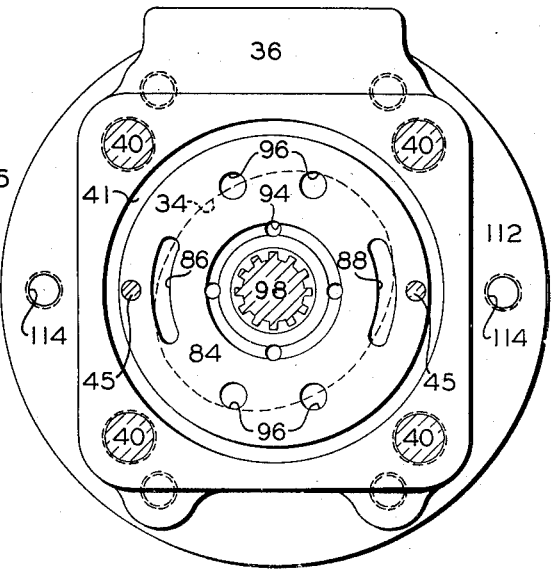

Figure 3 is a section taken on line 3—3 of Figure 1.
Figure 4 is a section taken on line 4—4 of Figure 1.
Figure 5 is a section taken on line 5—5 of Figure 1.
Figure 6 is a section taken on line 6—6 of Figure 1.
Figure 7 is a section taken on line 7—7 of Figure 1.

Referring now to Figure 1 the preferred embodiment of the present invention includes a pair of pumping units generally designated 10 and 12 spaced apart by an intermediate body portion 14. The pumping units illustrated are of the hydraulically balanced radially sliding vane type as described in the patents to Duncan B. Gardiner et al., No. 2,544,988 and to Ferris T. Harrington et al., No. 2,544,990.

As can best be seen in Figure 4, pumping unit 12 includes a rotor 16 having a plurality of radial slots 18 each with a vane 20 therein. Rotor 16 and vanes 20 are encircled by a cam ring 22 which has a pumping chamber 24 therein having a generally elliptical contour. Vanes 20 are biased against chamber 24 by centrifugal force and fluid pressure acting on the inner ends of the vanes. Corresponding parts of pumping unit 10 are the rotor 26, slots 28, vanes 30, cam ring 32, and pumping chamber 34. Since pumping units 10 and 12 are similar, no view of unit 10 corresponding to the view of unit 12 in Figure 4 has been shown. It should be noted, however, that although units 10 and 12 have been illustrated as being of equal size, the invention encompasses the pairing of different size units in a multiple pump of the type illustrated.

Cam rings 22 and 32, the central body element 14, a body element 36, and a head element 38 are secured together in a sandwich relation by a plurality of bolts 40 which extend through head 38, ring 22, central body element 14, ring 32, and into tapped holes in body 36, thus forming a composite housing for the unit. The junctures between the elements are sealed against fluid leakage by O ring seals 35, 37, 39, and 41. Head element 38 and body element 36 have therein outlet connection ports 42 and 44, respectively, and the central body element 14 has a single inlet connection port 43 therein. Proper angular alignment between the various elements is maintained by dowel pins 45.

Inlet connection port 43 communicates with a fluid passage 46 having branches 48, 50, 52, and 54 leading respectively to the kidney shaped suction ports 56, 58, 60, and 62. Ports 56 and 58 are machined in the face 64 of the central body element 14 and ports 60 and 62 are machined in the opposite face 66. Faces 64 and 66 are smooth, flat, and parallel to each other.

Outlet connection port 42 communicates with a pressure chamber 68 in the head element 38. A centrally imperforate deflectable pressure plate, or cheek plate, 70 is positioned in the chamber 68 and biased toward the rotor 16 and vanes 20 of pumping unit 12 by a spring 72. Cheek plate 70 is of the type described in the heretofore mentioned patent to Gardiner et al. and includes a pair of kidney shaped delivery ports 74 and 76 extending completely therethrough. Pumping unit 12 receives fluid through the suction ports 60 and 62 and delivers it through the delivery ports 74 and 76 in the cheek plate 70 to pressure chamber 68. The fluid pressure in chamber 68 acts to implement the biasing spring 72 to thus insure fluid sealing engagement at the axial abutment of the pressure plate 70 and the ends of the vanes 20 and the rotor 16. A plurality of drilled passages 78 in cheek plate 70 conduct fluid pressure to the inner ends of the vanes 20 thus biasing them outward. A plurality of blind holes 80 in the pressure plate are positioned axially opposite the suction ports 60 and 62 to provide an improved inlet condition for the pumping unit. The positional relationship in which pumping chamber 24 overlies intermediate body portion 14 and the pressure plate 70 is indicated by the dotted outline of chamber 24 in Figures 3 and 5.

Outlet connection port 44 communicates with a pressure chamber 82 in the body element 36. A centrally perforate deflectable pressure plate, or cheek plate, 84 is positioned in the chamber 82 and biased toward the rotor 26 and vanes 30 of pumping unit 10 by a finger spring 85. Cheek plate 84 is of the type described in the heretofore mentioned patent to Harrington et al. and includes a pair of kidney shaped delivery ports 86 and 88 extending completely therethrough. An axial extension 90 of the pressure plate 84 engages an O ring seal 92 in the body element 36 to prevent leakage from the pressure chamber. Pumping unit 10 receives fluid through the suction ports 56 and 58 and delivers it at an increased pressure through the delivery ports 86 and 88 in the cheek plate 84 to pressure chamber 82. The fluid pressure in chamber 82 acts to implement the biasing spring 85 to thus insure fluid sealing engagement at the axial abutment between the pressure plate and the ends of the vanes 30 and the rotor 26. A plurality of drilled passages 94 in cheek plate 84 conduct fluid pressure to the inner ends of the vanes 30 thus biasing them outward. A plurality of blind holes 96 in pressure plate 84 act in the same manner as those in plate 70 to improve operation of the pumping unit. The positional relationship in which pumping chamber 34 overlies intermediate body portion 14 and the pressure plate 84 is indicated by the dotted outline of chamber 34 in Figures 6 and 7.

A single drive shaft 98 is common to both the pumping units 10 and 12 and is supported between a bearing 100 in the body element 36 and a bearing 102 in the intermediate body portion 14. Shaft 98 extends through the central perforation in pressure plate 84 with sufficient clearance to permit passage of fluid therebetween. Spline 104 engages a female spline in the rotor 26 of unit 10 and spline 106 engages a female spline in the rotor 16 of unit 12. A conventional shaft seal 108 prevents leakage from the body element 36 at the emergence of the shaft therefrom.

Provisions for mounting the pump include a pilot 110 and a flange 112 having mounting holes 114 therein. It can be seen that when shaft 98 is driven by a prime mover, not shown, the rotors 26 and 16 of pumping units 10 and 12, respectively, will be conjointly driven. In operation, both units will be supplied with fluid at low pressure through the port 43 and the passage 46 in the intermediate body portion 14. Unit 10 will supply high pressure fluid to the connection port 44 in body element 36 and unit 12 will supply connection port 42 in head element 38.

It should be pointed out that all the component parts located to the left of face 66 as viewed in Figure 1, including pumping unit 12 and its associated pressure plate 70 and head element 38, are standard parts of a single pump of the type described in the heretofore mentioned patent to Gardiner et al. Such pumps are manufactured in large quantities in a wide range of sizes. Further, all the component parts located to the right of face 64 as viewed in Figure 1, including pumping unit 10 and its associated pressure plate 84, body element 36, bearing 100, and seal 108, are standard parts of a single pump of the centrally perforate cheek plate type, wherein the drive shaft extends through the cheek plate. Such single pump units are also produced in quantity and in a variety of sizes.

It can be seen that the only parts of the multiple pump illustrated which are not a standard production item used in single pump construction are the intermediate body portion 14 and the drive shaft 98. The economies of volume production are thus realized on nearly all of the components of the present invention. The few unique parts required for any particular combination, namely the drive shaft and intermediate body portion, are inexpensive and compact.

There has thus been provided a compact, efficient, low cost multiple pump unit.

Further, there has been provided a multiple pump unit having a minimum of special parts whereby a large number of size combinations may readily be assembled without the maintenance of a large and costly parts inventory.

While the form of embodiment of the invention as herein disclosed constitutes a preferred form, it is to be understood that other forms might be adopted, all coming within the scope of the claims which follow.

What is claimed is as follows:

1. A multiple pump comprising: a central body element having a pair of spaced apart parallel plane faces and having an external port therein; means forming a composite housing, said means including members abutting each of said plane faces, each of said members having a pumping chamber therein; a rotary pumping unit in each of said pumping chambers and abutting one of said plane faces; low pressure ports in each of said plane faces communicating with one of said pumping units; fluid passage means in said central body element extending between said external port and the ports in said plane faces; a cheek member abutting each of said pumping units on the opposite side from said plane faces; a common drive shaft in a driving relation with both pumping units and extending through one of said cheek members; and high pressure fluid ports in each of said cheek members communicating with one of said pumping units.

2. A multiple pump comprising: a central body element having a pair of spaced apart parallel plane faces and having an external port therein; means forming a composite housing, said means including members abutting each of said plane faces, each of said members having a pumping chamber therein; a rotary pumping unit in each of said pumping chambers and abutting one of said plane faces; low pressure ports in each of said plane faces communicating with one of said pumping units; fluid passage means in said central body element extending between said external port and the ports in said plane faces; a cheek member abutting each of said pumping units on the opposite side from said plane faces; a common drive shaft in a driving relation with both pumping units and extending through one of said cheek members; support means in said central body element for said shaft; and high pressure fluid ports in each of said cheek members communicating with one of said pumping units.

3. A multiple pump unit comprising: a central body element having a pair of spaced apart parallel plane faces and having an external port therein; a rotary pumping unit abutting each of said plane faces; low pressure ports in each of said plane faces communicating with one of said pumping units; fluid passage means extending between said external port and the ports in said plane faces; means forming a pressure chamber on the opposite side of each pumping unit from said plane faces; a pressure plate in each pressure chamber biased into fluid sealing engagement with its associated pumping unit by pressure in said pressure chamber; and high pressure fluid ports in each of said pressure plates interconnecting one of said pressure chambers and one of said pumping units.

4. A multiple pump unit comprising: a central body element having a pair of spaced apart parallel plane faces and having an external port therein; a rotary pumping unit abutting each of said plane faces; low pressure ports in each of said plane faces communicating with one of said pumping units; fluid passage means extending between said external port and the ports in said plane faces; means forming a pressure chamber on the opposite side of each pumping unit from said plane faces; a centrally imperforate pressure plate in one of said pressure chambers; a centrally perforate pressure plate in the other of said pressure chambers; a common drive shaft in a driving relation with both pumping units and extending through said centrally perforate cheek plate; and high pressure fluid ports in each of said pressure plates interconnecting one of said pressure chambers and one of said pumping units.

5. A multiple pump unit comprising: a central body element having a pair of spaced apart parallel plane faces and having an external port therein; a rotary pumping unit abutting each of said plane faces; low pressure ports in each of said plane faces communicating with one of said pumping units; fluid passage means extending between said external port and the ports in said plane faces; means forming a pressure chamber on the opposite side of each pumping unit from said plane faces; a centrally imperforate pressure plate in one of said pressure chambers; a centrally perforate pressure plate in the other of said presure chambers; a common drive shaft in a driving relation with both pumping units and extending through said centrally perforate cheek plate; support means in said central body element for said shaft; and high pressure fluid ports in each of said pressure plates interconnecting one of said pressure chambers and one of said pumping units.

6. A multiple pump comprising: a central body element having a pair of spaced apart parallel plane faces and having an external port therein; a rotary pumping unit abutting each of said plane faces; low pressure ports in each of said plane faces communicating with one of said pumping units; fluid passage means in said body element extending between said external port and the ports in said plane faces; a second body element adjacent one of said pumping units on the opposite side thereof from the abutting plane face; a head element adjacent the other one of said pumping units on the opposite side thereof from the abutting plane face; means forming pressure chambers in said second body element and said head element; a cheek member in each of said pressure chambers biased into fluid sealing engagement with the associated one of said pumping units by pressure in said pressure chambers; high pressure fluid ports in each of said cheek members establishing communication between one of said pumping units and its associated pressure chamber; and a pair of external high pressure ports, one in said second body element and one in said head element, each of said external high pressure ports being in communication with one of said pressure chambers.

7. A multiple pump comprising: a central body element having a pair of spaced apart parallel plane faces and having an external port therein; a rotary pumping unit abutting each of said plane faces; low pressure ports in each of said plane faces communicating with one of said pumping units; fluid passage means in said body element extending between said external port and the ports in said plane faces; a second body element adjacent one of said pumping units on the opposite side thereof from the abutting plane face; a head element adjacent the other one of said pumping units on the opposite side thereof from the abutting plane face; means forming pressure chambers in said second body element and said head element; a centrally imperforate cheek member in the pressure chamber in said head, said imperforate cheek member being biased into fluid sealing engagement with its associated pumping unit by pressure in said pressure chamber; a centrally perforate cheek member in the pressure chamber in said second body element, said perforate cheek member being biased into fluid sealing engagement with its associated pumping unit by pressure in said pressure chamber; a drive shaft extending through said centrally perforate cheek member to engage both of said pumping units; high pressure fluid ports in each of said cheek members to establish communication between one of said pumping units and its associated pressure chamber; and a pair of external high pressure ports, one in said second body and one in said head element, each of said external high pressure ports being connected to one of said pressure chambers.

References Cited in the file of this patent

UNITED STATES PATENTS

| | | |
|---|---|---|
| 2,432,825 | Sloane | Dec. 16, 1947 |
| 2,483,370 | Moineau | Sept. 27, 1949 |
| 2,544,988 | Gardiner et al. | Mar. 13, 1951 |
| 2,544,990 | Harrington et al. | Mar. 13, 1951 |
| 2,599,701 | Eames | June 10, 1952 |